(12) United States Patent
Togawa et al.

(10) Patent No.: US 6,324,849 B1
(45) Date of Patent: Dec. 4, 2001

(54) ENGINE WASTE HEAT RECOVERING APPARATUS

(75) Inventors: Kazuhiro Togawa; Hiroyuki Kitani, both of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/691,834

(22) Filed: Oct. 18, 2000

(30) Foreign Application Priority Data

Oct. 22, 1999 (JP) .................................................. 11-301032

(51) Int. Cl.[7] ...................................................... F02G 3/00
(52) U.S. Cl. ................................................. 60/616; 60/614
(58) Field of Search ............................... 60/614, 616, 618

(56) References Cited

U.S. PATENT DOCUMENTS

| | | | |
|---|---|---|---|
| 4,920,750 | * | 5/1990 | Iishiki et al. ........................ 60/618 X |
| 5,000,003 | * | 3/1991 | Wicks ..................................... 60/618 |
| 5,090,371 | * | 2/1992 | Schapertons et al. ............. 60/618 X |
| 5,121,607 | * | 6/1992 | George, Jr. .......................... 60/618 X |

FOREIGN PATENT DOCUMENTS

| | | |
|---|---|---|
| 2691372 | 11/1991 | (JP) . |
| 8-4586 | 1/1996 | (JP) . |

* cited by examiner

*Primary Examiner*—Hoang Nguyen
(74) *Attorney, Agent, or Firm*—Armstrong, Westerman, Hattori, McLeland & Naughton, LLP

(57) ABSTRACT

An engine cooling unit and an exhaust gas heat exchanger 9 for use with the exhaust gas from an engine are connected with a circulation path 12 for circulating a heat transfer medium. The output of the circulation path 12 is connected via a conduit 18 to an output heat exchanger installed in e.g. a hot water storage tank 17. The exhaust gas heat exchanger 9 is disposed across the circulation path 12 at the upstream side of the engine cooling unit of the engine 2. The heat transfer medium introduced into the exhaust gas heat exchanger 9 is set to a lower temperature enough to maintain the temperature of vapor in the exhaust gas of which heat is transferred to the heat transfer medium lower than the dew point. The heat transfer medium after drawing generic heat from the exhaust gas and receiving its condensation heat in the exhaust gas heat exchanger 9 is passed to the engine cooling unit 6A where it draws more heat. Accordingly, the heat generated by the engine 2 can be recovered at a higher efficiency.

10 Claims, 6 Drawing Sheets

ENGINE WASTE HEAT RECOVERING APPARATUS

BACKGROUND OF THE INVENTION

1. Field of the Invention

The present invention relates to a combustion engine waste heat recovering apparatus and particularly to heat recovering apparatus for receiving waste heat generated in an engine used as a power source in a cogeneration system.

2. Description of the Related Art

As the environmental protection has a global major issue, cogeneration systems having a gas engine as a power source fueled with city gases are now focused as local power generator facilities for both the power generation and the hot water supply. For recovering a waste heat in such a type of the cogeneration systems having a combustion engine as the power source, a heat recovering medium (commonly, cooling water for the engine) is introduced into an engine water cooling system to recover a heat form the system, and the heated medium is transferred to an exhaust gas heat exchanger to recover the exhaust heat from the engine (See Japanese Patent No. 2691372 and Japanese Patent Laid-open Publication (Heisei)8-4586).

FIG. 5 is a diagram showing changes in the temperature of the heat recovering medium (referred to as a heat transfer medium hereinafter) and the exhaust gas in a conventional waste heat recovering apparatus where the vertical axis represents the temperature and the horizontal axis represents flow direction of the heat transfer medium and the exhaust gas. The temperature of the heat transfer medium varies as is denoted by a characteristic curve Lm while the temperature of the exhaust gas in the exhaust gas heat exchanger is denoted by the curves Lga (in parallel-flow mode) and Lgb (in counter-flow mode). The directions of the exhaust gas flow in the parallel-flow mode and the counter-flow mode are expressed by pf and cf, respectively.

The heat transfer medium recovers heat from the engine while running through the engine cooling unit, hence increasing its temperature from p' to q'. As the heat transfer medium passes through the exhaust gas heat exchanger, it recovers heat from the exhaust gas and its temperature is increased from q' to r'. Simultaneously, the exhaust gas is deprived of its heat by the heat transfer medium decreases its temperature from g' to approximately r'. As the exhaust gas heat exchanger is disposed at the downstream with the engine cooling unit disposed at the upstream of the circulation path of the heat transfer medium, the heat transfer medium is exposed to the exhaust gas of a higher temperature than that of the engine in the exhaust gas heat exchanger, hence increasing a temperature difference $\Delta t$ before and after recovering the waste heat (cf. the temperature difference $\Delta t$ being slightly greater in the counter-flow mode than in the parallel-flow mode).

The recovered thermal quantity is proportional to a product of the temperature difference $\Delta t$ of the heat transfer medium between the entrance and the exit of the waste heat recovering apparatus and the flow of the heat transfer medium. Accordingly, the smaller the flow, the greater the temperature difference $\Delta t$ (or the recovered thermal energy) of the heat transfer medium becomes as shown in FIG. 5. If the flow of the heat transfer medium is great, the temperature difference will be declined.

FIG. 6 illustrates a temperature change of the heat transfer medium of which the flow is greater than that shown in FIG. 5. The temperature of the heat transfer medium varies as is denoted by a curve Lm1 when its temperature level at the entrance of the exhaust gas heat exchanger is lower than the dew point W of the exhaust gas. It varies as is denoted by a curve Lm2 when the temperature of the heat transfer medium is higher than the dew point W. The temperature of the exhaust gas is changed as indicated with lines Lg1 and Lg2 in both the cases. For simplicity of the description, the two cases are implemented in the parallel-flow mode.

The heat transfer medium introduced to the engine with its temperature a" lower than the dew point W of the exhaust gas recovers heat from the engine, then its temperature increases to c". Furthermore, as the heat transfer medium is passed through the exhaust gas heat exchanger, its temperature is increased in two steps. When the exhaust gas is deprived of its heat by the heat transfer medium, its temperature rapidly drops down from g. On the other hand, the heat transfer medium recovers heat from the exhaust gas and its temperature increases up to b" when the temperature of the exhaust gas drops down to the dew point W. As the exhaust gas reaches the dew point W, its contents (mainly water vapor contained in the exhaust gas) are condensed thus generating a condensation heat. The condensation heat is also absorbed by the heat transfer medium of which the temperature in turn rises up to f". Finally, the thermal energy bringing about a temperature difference $\Delta t1$ can be recovered.

Alternatively, the heat transfer medium having a temperature p" higher than the dew point W of the exhaust gas and being introduced to the engine recovers heat from the engine, then its temperature increases to q". Furthermore, as the heat transfer medium is passed through the exhaust gas heat exchanger, its temperature is increased to r". As a result of the heat recovering just mentioned, a temperature difference $\Delta t2$ can be recovered.

As clearly understood with the comparison between FIGS. 5 and 6, the conventional waste heat recovering apparatus when using a large amount of the heat transfer medium for heat energy recovery possibly limits the temperature difference of the heat transfer medium between before and after recovering the waste heat to a smaller level than with the use of a smaller amount of the heat transfer medium. It may be possible to increase the temperature of the heat transfer medium due to a heat of condensation of the contents of the exhaust gas when the initial temperature of the heat transfer medium is lower than the dew point W of the exhaust gas. However, the temperature of the heat transfer medium is duly increased by heat transfer from the engine cooling unit before the heat transfer medium arrives at the entrance of the exhaust gas heat exchanger. This causes the temperature of the heat transfer medium to hardly stay lower than the dew point W. It will hence take a significant length of time before the exhaust gas temperature drops down to the dew point W, thus rarely permitting the transfer of the condensation heat at a higher efficiency. If the temperature of the exhaust gas is quickly decreased to the dew point W, more portions of the condensation heat energy maybe transferred to the heat transfer medium. This issue has not yet been overcome.

SUMMARY OF THE INVENTION

The present invention has been developed in view of the above aspects and its object is to provide an engine waste heat recovering apparatus which can more effectively recover the condensation heat of exhaust gas contents generated in an exhaust gas heat exchanger.

An apparatus having a first feature of the present invention, includes a circulation path for circulating a heat transfer medium across an engine cooling unit and an exhaust gas heat exchanger for use of the exhaust gas from an engine and a conduit connecting the output side of the circulation path to an output heat exchanger, wherein the exhaust gas heat exchanger is disposed across the circulation path at an upstream side of the engine cooling unit, and the heat transfer medium to be introduced into the exhaust gas heat exchanger is controlled at a lower temperature enough to decline a temperature of water vapor contained in the exhaust gas, from which heat is transferred to the heat transfer medium, to lower than its dew point.

An apparatus having a second feature of the present invention is constructed as at least one of the temperature and the flow rate of the heat transfer medium is controlled so that the temperature of the water vapor in the exhaust gas remains lower than its dew point in the exhaust gas heat exchanger during the recovery of heat from the exhaust gas.

An apparatus having a third feature of the present invention is constructed as the duration of the recovery of heat from the exhaust gas includes a period of controlling at least one of the temperature and the flow rate of the heat transfer medium on the basis of the temperature of the exhaust gas or the temperature of the heat transfer medium or magnitude of thermal load so that the temperature of the water vapor in the exhaust gas remains lower than its dew point in the exhaust gas heat exchanger.

An apparatus having a forth feature of the present invention is constructed as the temperature of the heat transfer medium is controlled by starting and stopping the engine on the basis of the magnitude of the thermal load.

An apparatus having a fifth feature of the present invention includes an oil heat exchanger for transferring heat from the engine oil to the heat transfer medium, wherein the oil heat exchanger is provided midway of the circulation path at the upper stream side of the exhaust gas heat exchanger.

An apparatus having a sixth feature of the present invention includes a pump for circulating the heat transfer medium along the circulation path, which pump is provided on the circulation path in the vicinity of inlet of the oil heat exchanger.

According to the first to sixth features of the present invention, the heat transfer medium having a low temperature is introduced to the exhaust gas heat exchanger so that the temperature of water vapor in the exhaust gas is declined to lower than its dew point. This allows the heat transfer medium to receive generic heat from the exhaust gas and its condensation heat and then run into the engine cooling unit located at the downstream on the circulation path where it draws more heat. The heat transfer medium receiving a significant level of thermal energy is further transferred to the output heat exchanger.

According to the second feature of the present invention, the temperature of the water vapor in the exhaust gas is maintained lower than the dew point throughout the heat recovery operation recovering heat from the exhaust gas. According to the third feature of the present invention, the duration of the heat recovery operation recovering heat from the exhaust gas includes a period of operation during which the temperature of the water vapor stays lower than the dew point in the exhaust gas heat exchanger.

According to the fifth feature of the present invention, heat is also transferred from the engine oil which has been heated with the operation of the engine. As the thermal energy recovered from the engine oil is small as compared with the thermal energy transferred from the main body of the engine and the exhaust gas, the temperature increase by the transfer of heat from the engine oil is minimum. As a result, the efficiency of the recovery of heat can be increased without impairing the recovery of condensation heat and also the cooling of the engine oil can be enhanced.

According to the sixth feature of the present invention, the heat transfer medium passes through the pump before receiving heat from the engine and thus permits the pump to stay at relatively a low temperature. This can minimize the degradation with again of packings or the like hence extending the operational life of the pump.

DETAILED DESCRIPTION OF THE PREFERRED EMBODIMENTS

Figure 1:
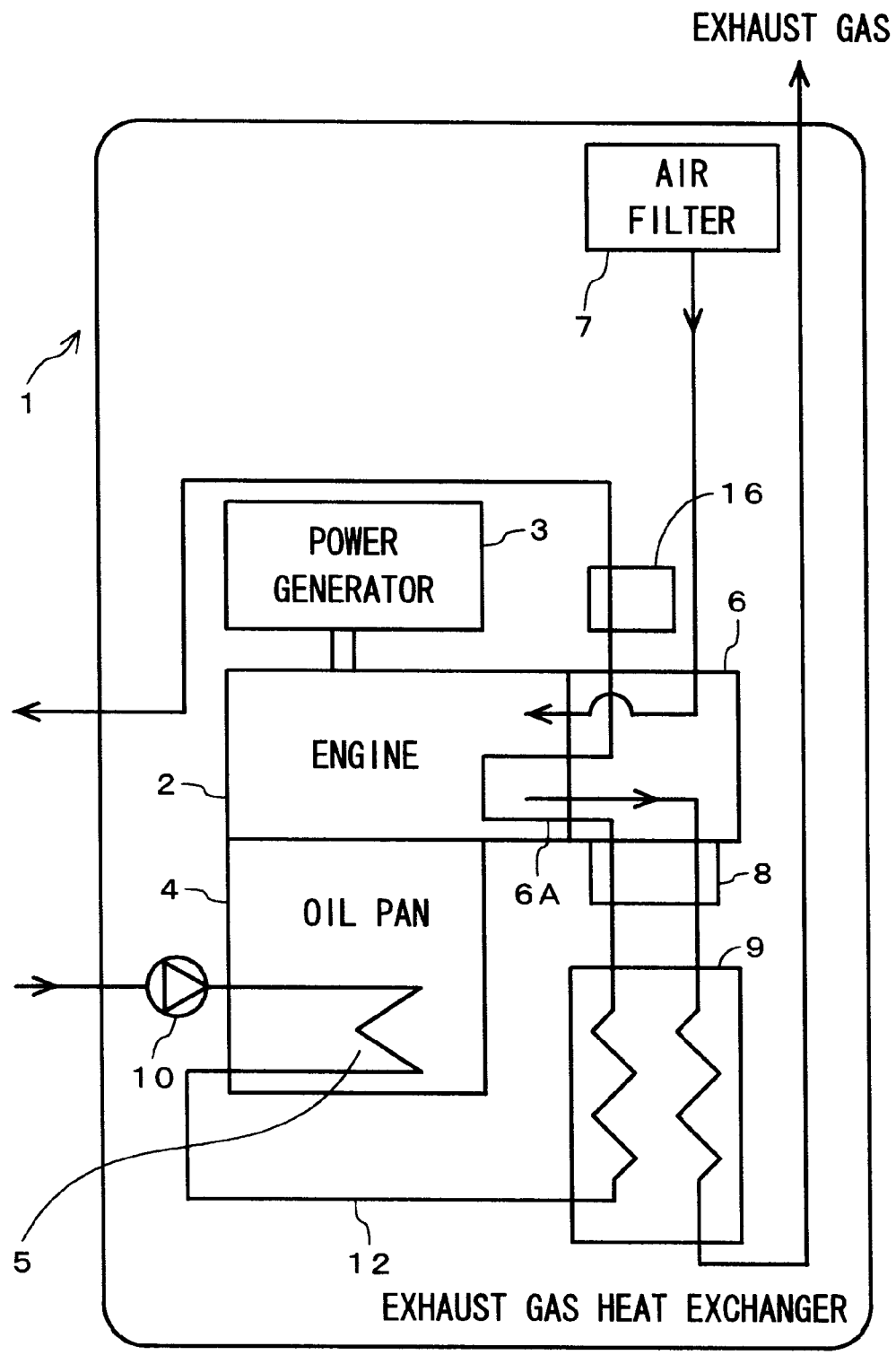
FIG. 1 is a block diagram showing a primary part of a waste heat recovering apparatus according to one embodiment of the present invention.

One embodiment of the present invention will be described in detail referring to the relevant drawings. Referring to FIG. 1, a waste heat recovering apparatus 1 installed in a cogeneration system is designed for recovering heat from the engine of an engine-driven power generator. The waste heat recovering apparatus 1 comprises the engine 2 and the power generator 3 mechanically connected to the engine 2. The power generator 3 generates an alternating current corresponding to the revolutions of the engine 2. The engine 2 is equipped with an oil pan 4 for storage of lubricant oil. The oil pan 4 includes an oil cooler (an oil heat exchanger) 5. The oil heat exchanger 5 transfers heat from the oil in the oil pan 4 to a heat transfer medium (a cooling water). A flow of air is introduced from an air filter 7 into a cylinder head 6 of the engine 2. An exhaust gas from the engine 2 passes through an exhaust manifold 8 and an exhaust gas heat exchanger 9 and then is discharged to the outside of the engine.

A circulation path 12 of the heat transfer medium is provided for effectively recovering the heat generated by the engine 2. A water pump 10 for circulating the heat transfer medium is mounted at the inlet of the circulation path 12. This arrangement allows other components such as seals to come into not direct contact with the heat transfer medium of a high temperature and hardly be degraded in the quality hence contributing to the longer operational life of the water pump 10. As the heat transfer medium is driven by the water pump 10, it runs through the oil heat exchanger 5 in the oil pan 4, the exhaust gas heat exchanger 9, the engine 2, and the cylinder head 6 and passes after a thermal cover 16 to a thermal load which will be described later in more detail. The thermal cover 16 may contain a built-in thermostat to shut off the path and block the flow of the heat transfer medium when the temperature is lower than a predetermined level.

As the heat transfer medium is circulated along the circulation path 12, it recovers heat generated by the engine 2 and transfers it to the thermal load. More particularly, when the heat transfer medium is fed into the oil heat exchanger 5 in the oil pan 4, it draws heat of the oil received from the engine 2 and cools down the oil. The heat transfer medium is then passed to the exhaust gas heat exchanger 9 where it receives heat from the exhaust gas released from the engine 2. The heat transfer medium increased in the temperature by heat transfer in both the oil heat exchanger 5 and the exhaust gas heat exchanger 9 is further passed through a pass or a water jacket 6A provided as an engine cooling scheme in the cylinder wall and the cylinder head 6 and hence draws more heat, increasing its temperature to a higher level.

Figure 2:
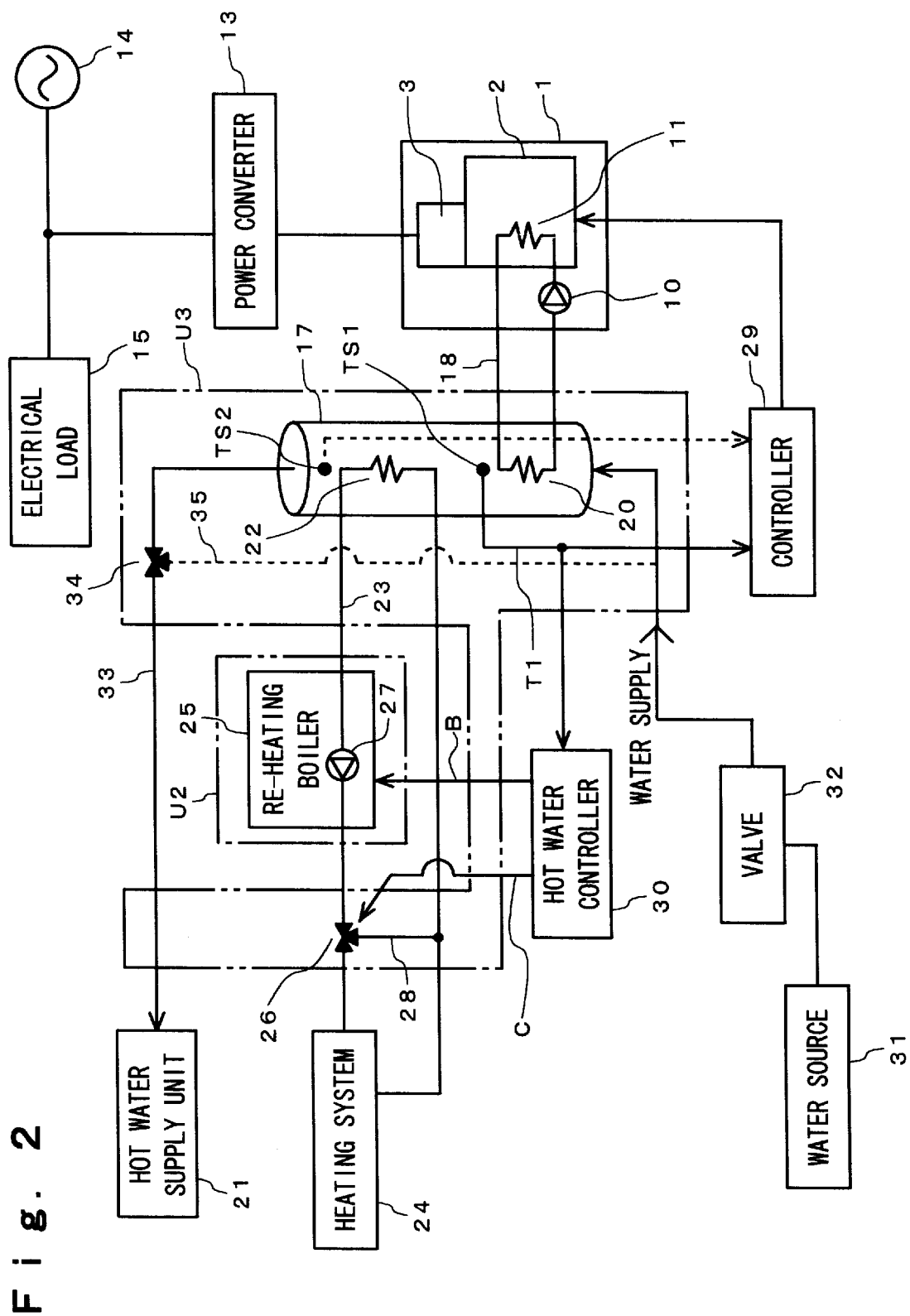
FIG. 2 is a block diagram showing an arrangement of a cogeneration system which includes a waste heat recovering apparatus according to embodiment of the present invention.

FIG. 2 illustrates an arrangement of a cogeneration apparatus having the engine power generator in its power generator section interconnected to a commercial power supply system.

A power converter 13 has a function of converting the AC output generated by the power generator 3 to an AC current of which the characteristics (of voltage, frequency, noise, etc.) are identical to those of the commercial power supply system and developing synchronization of the phase with the commercial power supply system. More particularly, the power converter 13 comprises a converter for converting the AC output released from the power generator 3 into a DC output, an inverter for inverting the DC output of the converter into an AC form which is identical in the frequency and the voltage to an input from the commercial power supply system, and other functional means including noise filters and interconnecting switches. An example of the power converter interconnected with the other (commercial) systems is disclosed in Japanese Patent Examined Publication (Hei) 4-10302. The AC output generated by the power generator 3 and converted by the power converter 13 is then supplied to an electrical load 15, which is also connected with the commercial power supply system 14.

The heat generated by the engine 2 for driving the power generator 3 is collected through a thermal exchange operation of a water cooling device and heat exchange unit (indicated generally by numeral 11) of exhaust gas heat exchanger 9 or the like. The cooling water which collects heat at heat exchange unit 11 is passed into a hot water storage tank 17 throughout a conduit 18 as used as a medium for carrying the heat to the hot water storage tank 17. The hot water storage tank 17 contains a output heat exchanger (referred to as a first heat exchanger hereinafter) 20 communicated with the conduit 18. The water supplied from a water source 31 to the hot water storage tank 17 is then heated by the first heat exchanger 20 to turn to a hot water. The hot water heated and saved in the hot water storage tank 17 is fed for further use to a hot water supply unit 21, which is a first thermal load.

A valve 32 is provided on a water pipe between the water source 31 and the hot water storage tank 17. The valve 32 is opened for supplying the water when the hot water in the hot water storage tank 17 decreases to below a predetermined level. The pump 10 which starts operating in synchronism with the engine 2 may automatically be switched off after a preset length of time (determined by a timer) since the engine 2 stops.

A second heat exchanger 22 is provided above the first heat exchanger 20 in the tank 17. The second heat exchanger 22 is communicated to a conduit 23, which in turn connected with a heating system 24, such as a central heating system or a floor heating system, acting as a second thermal load. The second conduit 23 forms a second hot water path, which is separated from the hot water path for supplying the hot water from the hot water storage tank 17 to the hot water supply unit 21. The second hot water path 23 performs secondary exchange of the heat from the hot water storage tank 17 thus increasing the efficiency of the heat recovery.

The second heat exchanger 22 is located at a position higher than the first heat exchanger 20 because the hot water heated by the first heat exchanger 20 has a higher temperature and convectively flows upwardly from the first heat exchanger 20. This allows the second heat exchanger 22 to take up more thermal energy from the hot water moved upward by the effect of convection.

In the second hot water path 23, there are also provided a re-heating boiler 25 and a three-directional valve 26. The re-heating boiler 25 is provided with a pump 27 for circulating the hot water throughout the second hot water path 23. The three-directional valve 26 is a means for switching the flow of the hot water to a bypass 28 or to the heating system 24. The following passages are selected by operating the three-directional valve 26. When the three-directional valve 26 is switched to the heating system 24, the passage is opened for conveying the hot water via the re-heating boiler 25 and the heating system 24 from and to the hot water storage tank 17. When the three-directional valve 26 is switched to the bypass 28, the passage is opened for conveying the hot water via the bypass 28, not the heating system 24, from and to the hot water storage tank 17.

A temperature sensor TS1 is provided in the hot water storage tank 17 and information about the temperature TI of the hot water measured by the temperature sensor TS1 is transmitted to a controller 29. The temperature sensor TS1 may be located at an appropriate height level between substantially the uppermost of the first heat exchanger 20 and the lowermost of the second heat exchanger 22 and most preferably at a midway between the first heat exchanger 20 and the second heat exchanger 22. It is very likely that, due to the effect of convection, the temperature of the hot water is lower at substantially the lowermost of the hot water storage tank 17 and higher at substantially the uppermost. As the temperature sensor TS1 is located at the midway, it can detect an average value of the temperature in the hot water storage tank 17.

In response to the temperature information TI, the controller 29 controls the start and stop operation of the engine 2. Since the temperature information TI represents the demand of heat from the hot water supply unit 21 which draws the hot water directly from the hot water storage tank 17 or from the heating system 24 which draws the hot water indirectly via the second heat exchanger 22, the controller 29 judges that the demand exceeds when the temperature information TI is not higher than a reference level Tref-1 and drives the engine 2 to generate the heat. On the other hand, when the temperature information TI is higher than the reference level Tref-1, the controller 29 judges that a sufficient level of the heat energy is saved in the hot water storage tank 17 and stops the operation of the engine 2.

The reference level Tref-1 of the temperature is determined from multiple parameters of the type and the magnitude of the thermal load (i.e. the type and the capacity of the hot water supply unit 21 and the heating system 24), the thermal output of the heat exchange unit 11, the volume of the hot water storage tank 17, and so on. The reference level Tref-1 has a hysteresis for ensuring a stable operation of the engine 2, i.e. avoiding frequent start and stop operations.

In case that the engine 2 is controlled with the temperature information TI, its operation may be contemplated for driving the power generator 3 to generate a constant power output or, in an electrical load dependent mode, to generate a variable output depending on the magnitude of the electrical load 15. In the constant power output mode, the engine 2 as a driving power source is operated to make the number of its revolutions constant and thus its operation will ensure a higher level of the efficiency minimizing the consumption of fuel and releasing an acceptable level of the exhaust gas. If the demand of electricity exceeds the output of the power generator 3, a deficiency in the electricity is covered by the supply from the commercial power supply system 14.

The temperature of the hot water in the hot water storage tank 17 is significantly varied depending on the consumption of the hot water, i.e. the demand of thermal energy, and the mode of the operation of the engine generator 10, e.g. either the constant output mode or the electrical load dependent mode. For example, in a system where when the consumption of the hot water is low, the temperature of the hot water can be maintained to about 80° C. with the power generator 3 operating in response to the temperature detected by the temperature sensor TS1, either abrupt, bulky consumption of the hot water resulting from the demand of heat given simultaneously from both the hot water supply unit 21 and the heating system 24 or the startup of the system may cause the temperature of the hot water in the hot water storage tank 17 to drop down to as a low degree as of the cool water supplied.

In case that the reference temperature of the hot water in the hot water storage tank 17 is hardly maintained with the heat collected from the engine 2, the re-heating boiler 25 functions effectively. The hot water controller 30 provides the re-heating boiler 25 and the three-directional valve 26 with a command "B" for re-heating and a command "C" for switching, respectively. The hot water controller 30 is preset with a lower reference temperature Tref-L which is lower than the reference temperature Tref-1 and when the temperature T1 of the hot water in the hot water storage tank 17 drops down to lower than the lower reference temperature Tref-L, it turns on the re-heating command "B" and the switching command "C". As the re-heating command "B" is turned on, the re-heating boiler 25 starts operating. As the switching command "C" is turned on, the three-directional valve 26 shifts its passage to the bypass 28. Accordingly, the hot water heated by the re-heating boiler 25 circulates through the conduit 23 and increases the temperature of the hot water in the hot water storage tank 17 via the second heat exchanger 22.

When the temperature of the hot water in the hot water storage tank 17 exceeds the lower reference temperature Tref-L, the re-heating command "B" and the switching command "C" are turned off to stop the operation of the re-heating boiler 25 and switch the three-directional valve 26 to the heating system 24 for the heating operation. The lower reference temperature Tref-L may have a hysteresis analogous to that of the reference temperature Tref-1.

As mentioned above, when the three-directional valve 26 has been switched to the bypass 28 responding to hot water supplying demand, the supply of the hot water to the heating system 24 stops. When the demand of the hot water supply unit 21 is to deliver the hot water to a bath or a kitchen, such delivery is rarely continued for an extensive length of time and thus stopping the supply of the hot water to the heating system 24 is also within only minutes. Accordingly, stopping duration of hot water circulation to the heating system 24 is also remains short. On the other hand, in the heating system 24 acting as the thermal load, the variation in the demand of the heat is rather moderate once the temperature in the room to be heated has risen up to its desired degree. Accordingly, since the temperature in the room seldom drops down extremely low with stopping of hot water circulation, there may unlikely be the occurrence of any problem in the practice.

Moreover, when the demand of the heat at the heating system 24 increases, the re-heating boiler 25 is turned on with the three-directional valve 26 switched to the heating system 24 thus to readily support the heating system 24 with a sufficient supply of the hot water. Increase of the demand of the heat at the heating system 24 may be judged based on a desired temperature preset in the heating system 24. It is also possible to have the three-directional valve 26 variable in the opening for returning at least a part of the hot water in the conduit 23 to the second heat exchanger 22 instead of switching of the entire flow of the hot water with the three-directional valve 26.

Figure 3:
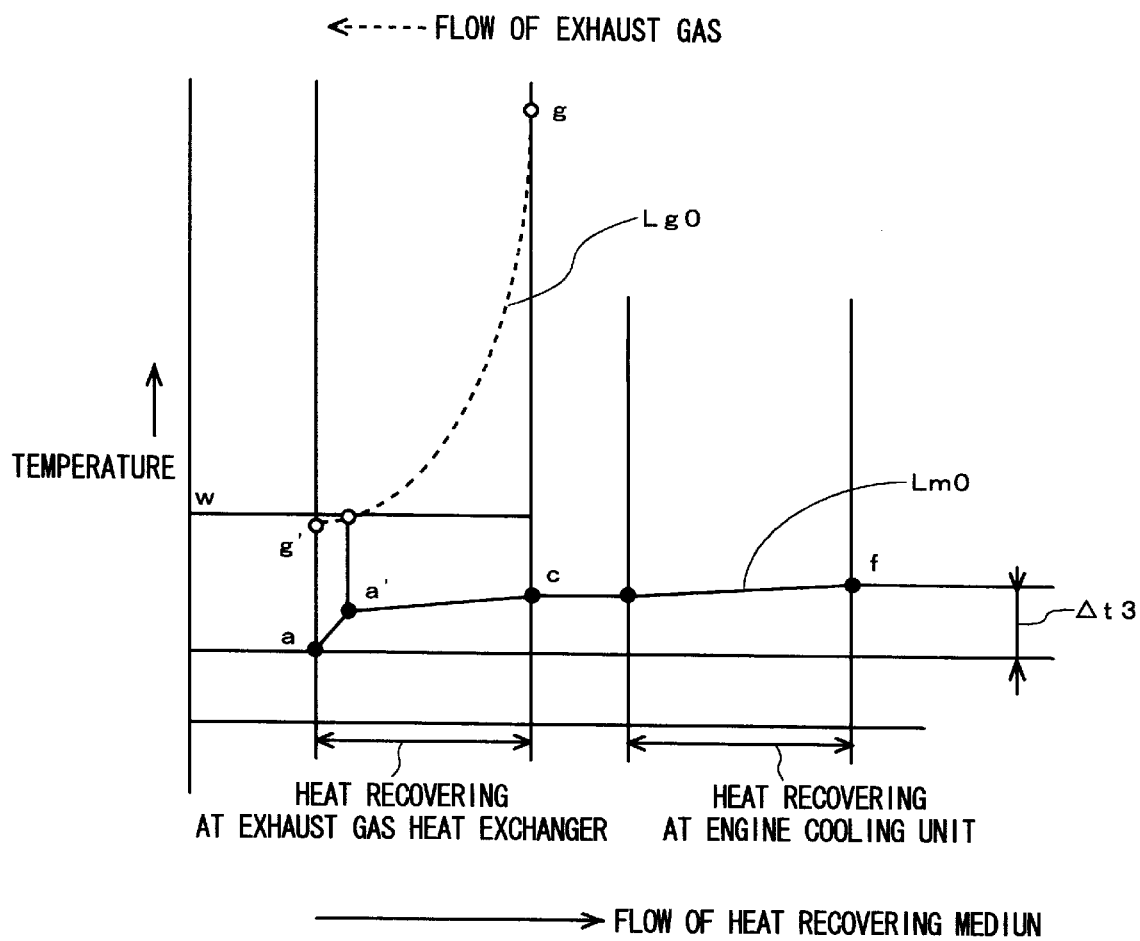
FIG. 3 is a graphic diagram showing changes in the temperature of a heat transfer medium and an exhaust gas.

In the exhaust gas heat exchanger 9, when the temperature of the exhaust gas is adjusted to lower than the dew point W of contents of the exhaust gas with an exhaust (gas) temperature detecting means provided between the inlet and the outlet, the recovery of condensation heat may be carried out with a higher efficiency. FIG. 3 illustrates a change in the temperature of the heat transfer medium between the inlet of the exhaust gas heat exchanger 9 and the cylinder head 6. As shown, the temperature of the heat transfer medium varies as is denoted by the curve Lm0 while the temperature of the exhaust gas varies as is denoted by the curve Lg0. The exhaust gas heat exchanger 9 is of a counter-flow type where the heat transfer medium and the exhaust gas flow in opposite directions with each other. In the figure, the directions of flow of the heat transfer medium and the exhaust gas are opposite to each other.

The exhaust gas having a temperature g at the heat transfer medium outlet or the exhaust gas inlet of the exhaust gas heat exchanger 9 drops down to a level g' lower than its dew point W at the heat transfer medium inlet or the exhaust gas outlet of the exhaust gas heat exchanger 9. In turn, the heat transfer medium introduced into the exhaust gas heat exchanger 9 draws the condensation heat of the exhaust gas and its temperature is sharply increased from a to a' within a short period of time. A gradient of the temperature increase (a–a') of the heat transfer medium across the exhaust gas heat exchanger 9 depends largely on the amount of flow and the initial temperature (a) of the heat transfer medium. The greater the flow of the heat transfer medium or the lower the initial temperature of the heat transfer medium, the more the gradient is acute.

During the transfer of heat from the exhaust gas having a temperature higher than the dew point W, the temperature of the heat transfer medium is moderately increased from a' to c at a less acute gradient than that of increasing from a to a'. The heat transfer medium having an increased temperature of c further receives heat from the engine cooling unit of the engine 2 and is then discharge from the waste heat recovering apparatus with its temperature increased up to f, hence yielding a temperature difference $\Delta t3$.

For efficiently recovering heat from the exhaust gas by means of transfer of the condensation heat of the contents of the exhaust gas, it is desired to control the flow and/or the temperature of the heat transfer medium to such a level that the temperature of the exhaust gas released from the exhaust gas heat exchanger 9 remains lower than the dew point W. With the initial temperature of the heat transfer medium at (the inlet of) the exhaust gas heat exchanger 9 set to a fixed level, when the flow of the heat transfer medium is large, the efficiency of the transfer of heat from the exhaust gas is increased. If the flow is smaller, the efficiency of recovering heat from the exhaust gas is declined. Once the temperature required at the thermal load or the magnitude of the thermal load has been determined, the target flow of the heat transfer medium is preset in combination with the temperature of the heat transfer medium corresponding to the thermal load magnitude so that the temperature of the exhaust gas remains lower than the dew point W. The target flow may be calculated through experiments. The calculated target of the flow can be realized by controlling the revolutions of the water pump 10.

If the requirement temperature or target temperature of the thermal load is too high, that temperature may fail to be gained with the flow target of the transfer medium which is determined so that the temperature of the exhaust gas remains lower than the dew point W. For compensation, the flow of the heat transfer medium shall be reduced for increasing its temperature at the entrance of the heat exchanger 9 and thus decreasing the recovery of the condensation heat. Even in that case, it is desired that the overall operating duration of the apparatus includes a longer period of the operation in which the flow target of the heat transfer medium which is determined so that the temperature of the exhaust gas remains lower than the dew point W.

Alternatively, with the flow of the heat transfer medium set to a fixed rate, the temperature of the exhaust gas can be reduced to lower than the dew point W by adjusting the entrance temperature thereof. First, a reference level Tw of the entrance temperature is determined so that the temperature of the exhaust gas remains lower than the dew point W. If the entrance temperature exceeds the reference level Tw and the efficiency of the recovery of heat is declined, the engine 2 is stopped. As the engine 2 has stopped and the entrance temperature drops down to lower than the reference level Tw, the engine 2 is restarted. By this manner, the entrance temperature of the heat transfer medium can be maintained to the reference level Tw, hence allowing the recovery of heat at a higher efficiency. Preferably, a temperature sensor for measuring the entrance temperature is provided at the inlet of the exhaust gas heat exchanger 9. Alternatively, the temperature sensor may be mounted, across the circulation path of the heat transfer medium, at the upstream side of the water pump 10 or closely before or after the cylinder head 6.

Start and stop operation of the engine 2 maybe controlled by determining a reference level Tref-1 of the temperature information T1. More specifically, the relationship between the entrance temperature and the temperature information T1 of the heat transfer medium is predetermined and used for setting the reference level Tref-1 in relation to the reference level Tw. When the engine 2 starts and stops according to whether the entrance temperature is lower than the reference level Tref-1 of the temperature information, the temperature of the exhaust gas can be maintained lower than the dew point W.

If the temperature level required at higher thermal load with the reference temperature Tw of the heat transfer medium determined so as to maintain the temperature of the exhaust gas lower than the dew point W, required temperature level may hardly be obtained. In this case, the reference level Tw of the entrance temperature of the heat transfer medium is set relatively high to obtain such temperature level. Such an increased value of the reference temperature Tw should be determined through experiments, provided that the requirement at the thermal load is satisfied without significantly declining the efficiency of the transfer of heat throughout the operating duration which includes a period in which the temperature of the exhaust gas is kept higher than the dew point W. The same may result when timing of start and stop of the engine 2 is controlled by adjusting the hysteresis of the reference temperature Tref-1.

In case that a hot water tank 17 is provided, it is desired to maintain the temperature of hot water in the tank 17 to a particular level corresponding to the requirement at the thermal load. Assuming that the operation of the engine 2 is stopped when the temperature information T1 received from the temperature sensor TS1 is higher than the reference level Tref-1, the flow of the heat transfer medium can be determined in consideration of the operating conditions of the engine 2. More particularly, when the starting and stopping control of the engine 2 is proceeded to maintain the temperature of the hot water equal to the reference level Tref-1, the result of the operating conditions is utilized to calculate the amount of the waste heat released from the engine 2 through experiments and the flow of the heat transfer medium relative to the amount of the waste heat is thus determined so that the temperature remains not exceeding the reference level Tw. Accordingly, while the flow is fixed, the temperature of the heat transfer medium can be maintained to the reference level Tw through turning on and off the engine 2 hence allowing the temperature of the exhaust gas to remain lower than the dew point W.

In case that the temperature of the exhaust gas is maintained lower than the dew point W on the basis of the temperature of the heat transfer medium, like the case that the temperature of the exhaust gas is maintained lower than the dew point W on the basis of the flow of the heat transfer medium, it is desired to determine the temperature of the heat transfer medium so that the overall operating includes a longer period of the time when the temperature of the exhaust gas remains lower than the dew point W.

The controlling manner is not limited to the case in which one of the flow and the temperature of the heat transfer medium is controlled while the other is fixed but may be carried out with both the flow and the temperature being variable. In brief, the thermal energy of the heat transfer medium to be introduced into the exhaust gas heat exchanger 9 can favorably be controlled to such a level that the transfer of heat from the exhaust gas loaded into the exhaust gas heat exchanger 9 is most efficiently performed while satisfying the requirement at the thermal load.

It may also be possible to measure directly the temperature of the exhaust gas and determine the temperature and the flow of the heat transfer medium so that the temperature of the exhaust gas is converged to a reference level, instead of detecting and controlling the temperature and the flow of the heat transfer medium to their reference levels, for maintaining the temperature of the exhaust gas to lower than the dew point W. In that case, temperature sensors for measuring the temperature of the exhaust gas are provided in the exhaust gas heat exchanger 9 and at the upstream or downstream side of the same (preferably adjacent to the outlet of the exhaust gas).

Figure 5:
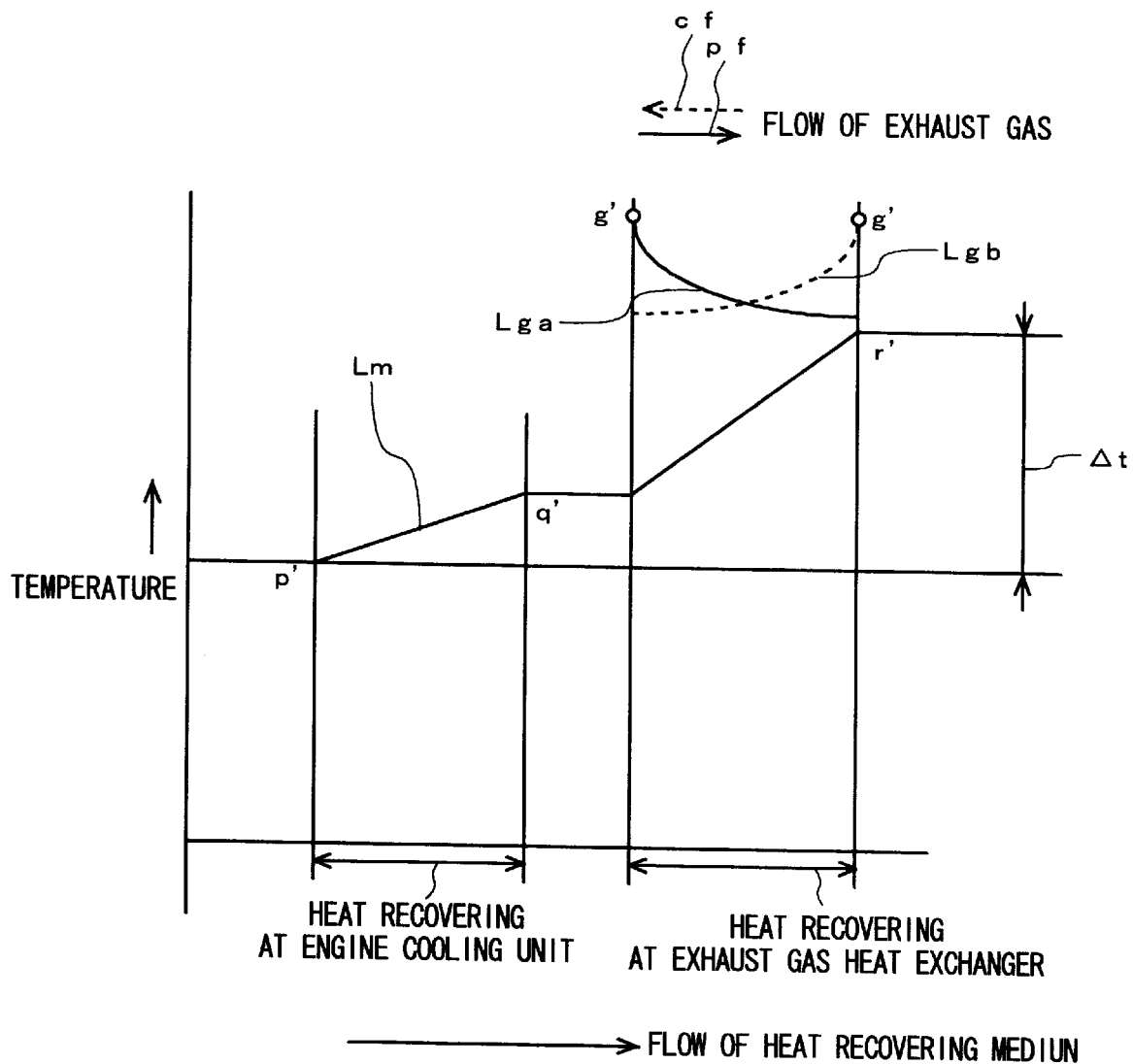
FIG. 5 is a graphic diagram showing changes in the temperature of a heat transfer medium and an exhaust gas in a prior art.
Figure 6:
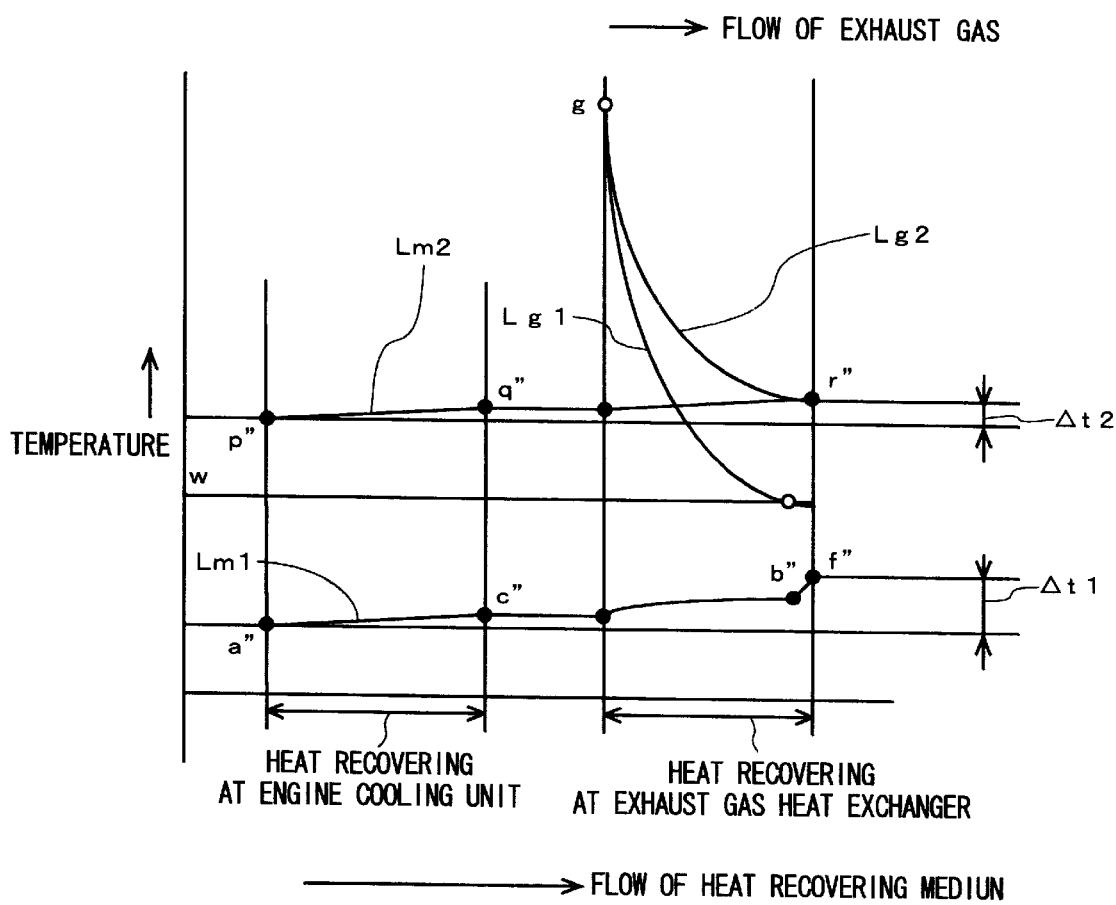
FIG. 6 is a graphic diagram showing changes in the temperature of a heat transfer medium and an exhaust gas in another prior art.

As described, the flow and the temperature of the heat transfer medium at the entrance of the exhaust gas heat exchanger 9 are controlled to maintain the temperature of the exhaust gas lower than the dew point W in the exhaust gas heat exchanger 9, whereby the efficiency of transferring the condensation heat from the exhaust gas to the heat transfer medium can successfully be increased. Finally, the temperature increase (a temperature difference Δt3) of the heat transfer medium by the heat received is higher than that of the conventional apparatus shown in FIG. 5. Particularly when the temperature of the heat transfer medium to be introduced into the exhaust gas heat exchanger 9 is lower than the dew point W of the exhaust gas, the above effect will be enhanced by feeding the heat transfer medium to the exhaust gas heat exchanger 9 prior to the engine cooling unit.

Figure 4:
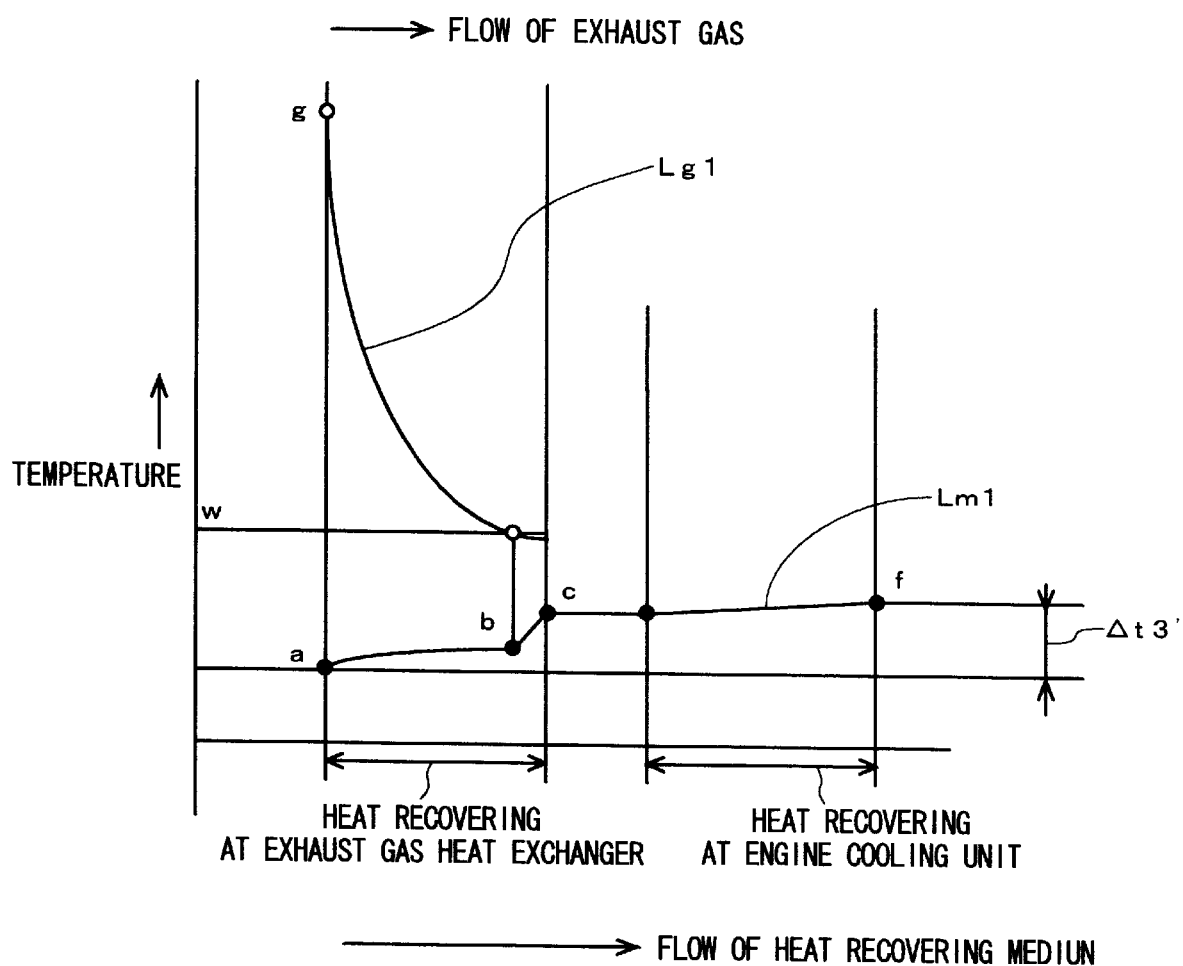
FIG. 4 is a graphic diagram showing changes in the temperature of a heat transfer medium and an exhaust gas in a waste heat exchanger of a parallel-flow mode.

Although the exhaust gas heat exchanger 9 of the embodiment is of a counter-flow type, it may be implemented by a parallel-flow type with equal success. FIG. 4 illustrates a temperature profile of the heat transfer medium between the inlet of the exhaust gas heat exchanger 9 of a parallel-flow type and the cylinder head 6. The temperature of the heat transfer medium varies when it is lower at the entrance of the exhaust gas heat exchanger 9 than the dew point W of the exhaust gas as is denoted by the curve Lm1, while the temperature of the exhaust gas varies as is denoted by the curve Lg1.

As shown, the heat transfer medium having a temperature a is introduced into the exhaust gas heat exchanger 9 and it draws heat from the exhaust gas having a temperature g hence gradually decreasing the temperature of the exhaust gas. Upon the temperature of the exhaust gas dropping down to the its dew point W (the heat transfer medium heated up to a temperature b), the content of the exhaust gas is condensed thus releasing the condensation heat and increasing the temperature of the heat transfer medium at a sharp gradient (denoted by the line bc). Finally, the temperature difference of Δt3' can be achieved. Similar to the counter-flow type, the gradient is determined by the flow and the temperature (at the level a) of the heat transfer medium to be introduced into the exhaust gas heat exchanger 9. The greater the flow or the lower the temperature of the heat transfer medium, the more the gradient becomes sharp. This will equally be accomplished with not only the parallel-flow type or the counter-flow type of the heat exchanger but also a orthogonal-flow type or their modification.

In the embodiment, the oil heat exchanger 5 is also employed for recovering heat from the oil in the oil pan 4. This is effective particularly when the temperature of the heat transfer medium can be increased with difficulty such as in very cold regions. While the oil heat exchanger 5 enables to effectively reduce the temperature of the oil, it may be omitted depending on the conditions of an installation site.

As set forth above, the features of the present invention defined in claims 1 to 10 allow the heat generated in the engine to be efficiently transferred to the heat transfer medium. In particular, the exhaust gas heat exchanger is disposed at the upper stream side of the engine cooling unit permitting water vapor in the exhaust gas to be readily condensed by the action of the heat transfer medium having relatively a lower temperature and also encouraging the recovery of condensation heat.

According to the features of the present invention defined in claims 3 to 6, the condensation heat is recovered with the water vapor in the exhaust gas remaining lower than its dew point thus allowing partially a period of operation with properly controlling the temperature and/or the flow of the heat transfer medium. This will increase the temperature of the heat transfer medium while enhancing the efficiency of the heat recovery.

According to the feature defined in claim 9, heat is recovered from the engine oil of which the temperature is increased by the operation of the engine. The thermal energy of this heat is small as compared with the thermal energy transferred directly from the main shell of the engine or the exhaust gas. The temperature increase of the heat transfer medium by this heat will be minimum. As a result, the heat recovering efficiency can be increased without impairing the recovery of the condensation heat and the engine oil can effectively be cooled down. According to the feature defined in claim 10, the life of the pump for circulating the heat transfer medium can be extended.

What is claimed is:

1. An engine waste heat recovering apparatus having a circulation path for circulating a heat transfer medium across an engine cooling unit and an exhaust gas heat exchanger for use of the exhaust gas from an engine and a conduit connecting the output side of the circulation path to an output heat exchanger, wherein the exhaust gas heat exchanger is disposed across the circulation path at an upstream side of the engine cooling unit, and the heat transfer medium to be introduced into the exhaust gas heat exchanger is controlled at a lower temperature enough to decline a temperature of water vapor contained in the exhaust gas, from which heat is transferred to the heat transfer medium, to lower than its dew point.

2. An engine waste heat recovering apparatus according to claim 1, wherein at least one of the temperature and the flow rate of the heat transfer medium is controlled so that the temperature of the water vapor in the exhaust gas remains lower than its dew point in the exhaust gas heat exchanger during the recovery of heat from the exhaust gas.

3. An engine waste heat recovering g apparatus according to claim 1, further comprising:

exhaust gas temperature detecting means for detecting the temperature of the exhaust gas, where in the duration of the recovery of heat from the exhaust gas includes a period of controlling at least one of the temperature and the flow rate of the heat transfer medium on the basis of the temperature of the exhaust gas detected by the exhaust gas temperature detecting means so that the temperature of the water vapor in the exhaust gas remains lower than its dew point in the exhaust gas heat exchanger.

4. An engine waste heat recovering apparatus according to claim 3, wherein the temperature of the exhaust gas is measured inside or in the vicinity of the exhaust gas heat exchanger.

5. An engine waste heat recovering apparatus according to claim 1, further comprising:

means for detecting the temperature of the heat transfer medium midway of the circulation path, wherein the duration of the recovery of heat from the exhaust gas includes a period of controlling at least one of the temperature and the flow rate of the heat transfer medium on the basis of the temperature of the heat transfer medium detected by the heat transfer medium temperature detecting means so that the temperature of the water vapor in the exhaust gas remains lower than its dew point in the exhaust gas heat exchanger.

6. An engine waste heat recovering apparatus according to claim 1, further comprising:

means for detecting the magnitude of a thermal load connected thereto via the output heat exchanger, wherein the duration of the recovery of heat from the exhaust gas includes a period of controlling at least one of the temperature and the flow rate of the heat transfer medium on the basis of the magnitude of the thermal load detected by the thermal load detecting means so that the temperature of the water vapor in the exhaust gas remains lower than its dew point in the exhaust gas heat exchanger.

7. An engine waste heat recovering apparatus according to claim 6, wherein the temperature of the heat transfer medium is controlled by starting and stopping the engine on the basis of the magnitude of the thermal load.

8. An engine waste heat recovering apparatus according to claim 1, further comprising:
   pump for circulating the heat transfer medium along the circulation path, which pump is provided on the circulation path at upper stream side of the inlet of the exhaust gas heat exchanger.

9. An engine waste heat recovering apparatus according to claim 1, further comprising:
   an oil heat exchanger for transferring heat from the engine oil to the heat transfer medium, wherein
   the oil heat exchanger is provided midway of the circulation path at the upper stream side of the exhaust gas heat exchanger.

10. An engine waste heat recovering apparatus according to claim 9, further comprising:
   a pump for circulating the heat transfer medium along the circulation path, which pump is provided on the circulation path in the vicinity of inlet of the oil heat exchanger.

* * * * *